UNITED STATES PATENT OFFICE.

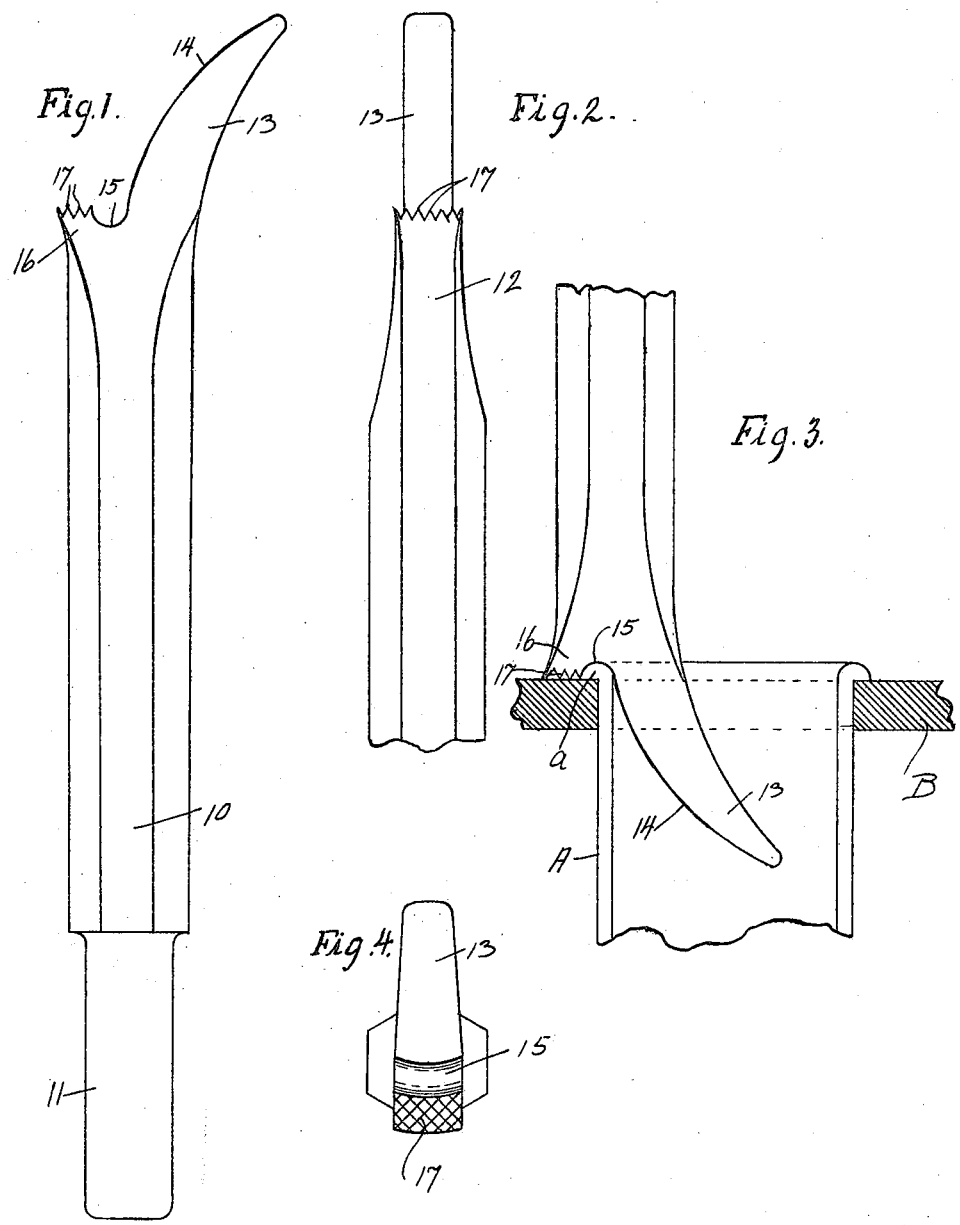

SAMUEL R. HASELHURST, OF MEADVILLE, PENNSYLVANIA.

COMBINED CLEANING AND BEADING TOOL.

1,323,052.　　　　Specification of Letters Patent.　　Patented Nov. 25, 1919.

Application filed April 2, 1919. Serial No. 286,829.

*To all whom it may concern:*

Be it known that I, SAMUEL R. HASELHURST, a citizen of the United States, residing at Meadville, in the county of Crawford and State of Pennsylvania, have invented certain new and useful Improvements in Combined Cleaning and Beading Tools, of which the following is a specification, reference being had to the accompanying drawings.

This invention relates to tools used for overturning the ends of boiler flues or under like circumstances, and the general object of the invention is the provision of a tool so constructed that the boiler sheet immediately surrounding that portion of the flue which is to be overturned or beaded may be chipped or cleaned of scale, rust, or corrosion while a boiler tube or flue is being overturned or beaded.

It is common practice today to electrically weld the fire box end of flues in steam boilers to the flue sheet, and in order to effect such welding successfully, it is essential that all rust and scale be removed from the surfaces to be welded so that the two surfaces shall be bright and clean. This is especially necessary where repair work is being done and where the flue sheet has been acted on by fire so that a hard scale forms. It is necessary to remove this scale not only beneath the overturned end of the flue engaged with the flue sheet, but outward of the annular face upon which the overturned end of the flue engages, for the reason that in electric welding a certain voltage and amperage of electric current is necessary and allowed for in the work to be done, and when the parts to be welded are covered with scale, it is necessary to raise the voltage over the amount specified because it is necessary to burn through the crust and scale. This temperature to which the parts are raised is thus greater than necessary and burns up the welding metal and causes it to blister and leaves the welded parts in a more or less porous condition so that the parts leak. On the other hand, when the parts to be welded are thoroughly cleaned of scale not only at the point of contact between the ends but adjacent this point of contact, it takes less electric energy to accomplish the welding and the welded parts are not porous or leaky. Heretofore this scale has been removed by chipping with a chisel and hammer, and this manner of chipping away the scale and cleaning the surfaces of the flue sheet requires much time and patience.

In order to obviate this, I have provided a tool combining a beading tool and a chipping tool, and adapted to be used in connection with the ordinary pneumatic hammer so that the surface of the flue sheet immediately surrounding the flue or tube may be chipped while the flue or tube itself is being overturned or beaded.

A further object is to provide a tool of this character with a curved nose extending into the flue or tube, an arcuate, concavely rounded recess at the base of this nose, which recess acts to overturn and form the bead on the extremity of the flue, the tool exteriorly of this arcuate recess being formed with a serrated or toothed face which will cut off or chip away the scale upon the boiler sheet.

My invention is illustrated in the accompanying drawings, wherein:—

Figure 1 is a side elevation of a tool constructed in accordance with my invention;

Fig. 2 is a front elevation thereof;

Fig. 3 is a side elevation showing the tool in use to form the bead on the boiler flue; and Fig. 4 is an under side plan view of the tool.

By reference to these drawings, it will be seen that my improved tool comprises a shank 10 which is reduced at one end, as at 11, to fit the shank or operating member of a pneumatic hammer, not illustrated. At its active end this shank is gradually reduced in width, as at 12, and prolonged laterally and outwardly to form an outwardly curved nose 13, the inner face 14 of which is convexly rounded, this nose tapering toward its extremity. At the base of this nose, the tool is formed with an arcuate concave recess 15 which will fit, as illustrated in Fig. 3, the bead *a* of a boiler flue A. Exteriorly of this beading recess 15, the tool is formed with a relatively flat heel 16 serrated to produce a plurality of cutting points or teeth 17 which, while the recess 15 is acting to form the bead *a* and overturn it upon the boiler sheet B, will act to chip away the scale, rust, or the oxidized surface of the boiler sheet so as to provide for electrical welding of the parts *a* and B.

The tool, of course, is to be formed of tempered steel, and the particular shape of the tool will depend upon the work to be accomplished.

While I have illustrated and described it with particular reference to the overturning of the ends of boiler flues onto the flue sheet, it will be understood that it might be used for other purposes of the same character in other situations, and that I do not wish to be limited to this.

Assuming, for instance, that an old flue or damaged flue has been removed from the flue sheet B in Fig. 3, then in the operation of removing this damaged flue, the bead a will be cut off, and in the process of chipping off this bead, the surface below the bead a, that is the surface immediately surrounding the flue opening, will be cleaned, but the scale which has accumulated exterior to the bead a will not be cleaned and, as before remarked, it is necessary that this scale also should be chipped off in order that the welding operation may be carried out. By the use of this tool the cutting away of this scale, rust, etc., may be accomplished at the same time that the bead a is overturned onto the flue sheet, and the use of this tool does away with the slow hand work heretofore used for removing the scale, and not only this, but this tool cleans the flue sheet of scale and rust much better than is otherwise possible, and with great economy of time. This is also true where new flue sheets are used, to which new flues are to be engaged. These flue sheets are annealed and the surface of the flue sheet is covered with scale formed by this annealing action, and under these circumstances while the bead a is being forced down on the sheet, the work of overturning the bead will cause the scale to break and be forced out by the pressure and pounding of the hammer used, and at the same time the scale immediately surrounding the bead a is being broken off and chipped away by the points 17.

It will be understood that in the use of this tool, the nose 13 extends inside of the tube A and the curved face of this nose 13 forces part of the tube outward to form a bead a by being held at an angle to the axis of the tube and then gradually turned to a position parallel to the axis, as in Fig. 3.

I claim:—

1. A tool of the character described comprising a shank terminating in a longitudinally and outwardly curved nose, the end of the shank at the base of said nose being formed with an arcuately curved, concave beading recess and exteriorly of said beading recess with a relatively flat heel serrated to provide cutting edges.

2. A tool of the character described formed at one end to engage with a pneumatic hammer and at the other end formed to provide an elongated, longitudinally extending, outwardly curved, tapering nose, an arcuate beading portion at the base of said nose, and exteriorly to the beading portion to provide a relatively flat, serrated heel.

In testimony whereof I hereunto affix my signature in the presence of two witnesses.

SAMUEL R. HASELHURST.

Witnesses:
CHAS. W. BINKHARDT,
Mrs. P. H. SHELVEY.